US011172795B2

United States Patent
Yoo et al.

(10) Patent No.: US 11,172,795 B2
(45) Date of Patent: Nov. 16, 2021

(54) DRYER STAND

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 16/576,378

(22) Filed: Sep. 19, 2019

(65) Prior Publication Data

US 2020/0085255 A1 Mar. 19, 2020

Related U.S. Application Data

(60) Provisional application No. 62/733,478, filed on Sep. 19, 2018.

(30) Foreign Application Priority Data

Feb. 19, 2019 (KR) .................. 10-2019-0019328

(51) Int. Cl.
*F26B 25/00* (2006.01)
*A47K 10/48* (2006.01)
*A45D 20/12* (2006.01)
*F16M 11/12* (2006.01)

(52) U.S. Cl.
CPC .............. *A47K 10/48* (2013.01); *A45D 20/12* (2013.01); *F16M 11/126* (2013.01); *A45D 2020/128* (2013.01)

(58) Field of Classification Search
CPC ........ A47K 10/48; A45D 20/12; A45D 20/14; A45D 2020/128; A45D 2020/126; F16M 11/126; F16M 11/2014; F16M 11/24; F16M 11/10; F16M 11/041; F16M 11/18; F16M 13/00; A01K 13/001; F24F 8/108; F24F 8/158; F24F 8/22; F24F 8/10
USPC ............................................ 34/239, 96, 283
See application file for complete search history.

(56) References Cited

U.S. PATENT DOCUMENTS

2006/0076464 A1   4/2006 Van
2018/0103741 A1*  4/2018 Karbakhsh ................ B25J 9/06

FOREIGN PATENT DOCUMENTS

| JP | 58-133004 U | | 9/1983 | |
| KR | 2018043526 A | * | 4/2018 | ............ A45D 44/06 |
| TW | I252087 B | | 4/2006 | |

* cited by examiner

*Primary Examiner* — John P McCormack
(74) *Attorney, Agent, or Firm* — Birch, Stewart, Kolasch & Birch, LLP (57) ABSTRACT

A dryer stand including a stem, a base, a receptacle on which a dryer is mounted, and a rotator including a rotation motor. An air discharge direction of the dryer can be automatically controlled by controlling the rotation direction and angle of the rotation motor based on the position and size of an object to be dried detected by a sensor.

16 Claims, 8 Drawing Sheets

DRYER STAND

CROSS REFERENCE TO RELATED APPLICATIONS

This application claims the priority benefit of U.S. Provisional Application No. 62/733,478, filed on Sep. 19, 2018, and Korean Patent Application No. 10-2019-0019328, filed on Feb. 19, 2019, the entire disclosures of all of which are hereby expressly incorporated by reference into the present application.

BACKGROUND OF THE DISCLOSURE

Field of the Disclosure

The present disclosure relates to a dryer stand on which a dryer for discharging air for drying is mounted. More particularly, the present disclosure relates to a dryer stand capable of changing the discharge direction of air for drying based on the position and size of an object to be dried by rotating a receptacle on which a dryer is mounted left and right.

Description of the Related Art

If a dryer is used to dry the human body, in general, a user holds a dryer and performs dry while moving the dryer toward a dry portion.

In order to solve inconvenience that a user has to perform dry while holding a dryer, conventionally, there has been proposed a stand on which the dryer can be mounted.

However, the stand according to a conventional technology has a problem in that if a dry portion is to be changed, a user has to directly control the direction of the stand or the human body needs to be moved so that the air discharge direction of the dryer mounted on the stand is directed toward a dry portion.

In particular, the stand according to a conventional technology has a problem in that if an object to be dried is an infant or a pet, the air discharge direction of a dryer has to be frequently changed if a position of the object to be dried is frequently changed.

Furthermore, the stand according to a conventional technology has not suggested a mechanical configuration capable of automatically controlling the air discharge direction of the dryer.

Furthermore, the conventional technology lacks a mechanical configuration capable of automatically controlling the air discharge direction of a dryer in the up and down direction and/or the front and rear direction in addition to the left and right direction at the same time or different times.

SUMMARY OF THE DISCLOSURE

A first problem to be solved by the present disclosure is to provide a dryer stand capable of performing dry on an object to be dried without a need for a user to hold a dryer.

A second problem to be solved by the present disclosure is to provide a dryer stand capable of automatically changing the discharge direction of air for drying left and right based on the position and size of an object to be dried.

A third problem to be solved by the present disclosure is to provide a dryer stand capable of automatically changing the discharge direction of air for drying in the up and down direction and/or the front and rear direction simultaneously with or at times different from those of the left and right direction.

The objects of the present disclosure are not limited to the above-described objects and the other objects will be understood by those skilled in the art from the following description.

In an aspect, the present disclosure relates to a dryer stand on which a dryer for discharging air for drying is mounted.

A dryer stand according to an embodiment of the present disclosure includes a stem, a base, a receptacle on which a dryer is mounted, and a rotation apparatus including a rotation motor. In this case, the rotation apparatus can control the air discharge direction of the dryer by rotating receptacle left and right in accordance with the forward or backward rotation of the rotation motor.

The rotation apparatus may include a rotation pinion coupled to a rotation shaft of the rotation motor and rotation gear teeth geared with the rotation pinion. The rotation gear teeth may be formed on one side of the supporter in which the receptacle is received. Accordingly, the supporter and the receptacle received in the supporter are rotated left and right in accordance with the forward or backward rotation of the rotation motor, so the air discharge direction of the dryer can be controlled.

Furthermore, the dryer stand according to an embodiment of the present disclosure may further include a vertical rod positioned in the stem and having a top connected to the supporter. Furthermore, an inward depressed groove is formed in the vertical rod, and a protruded part rotatably inserted into the groove is formed at the bottom of the supporter. Accordingly, the left and right rotation of the supporter can be guided stably.

Furthermore, the dryer stand may further include an elevation apparatus positioned in the stem and configured to move the vertical rod and the supporter up and down. At this time, the rotation motor is coupled to the vertical rod and moved up and down along with the vertical rod. Accordingly, the left and right rotation and/or up and down movement of the supporter and the receptacle received in the supporter can be performed at the same time or different times.

Furthermore, the dryer stand may further include a tilting apparatus configured to rotate the receptacle front and back (e.g., in the forward and backward directions) with respect to the dryer stand. The receptacle is received within the supporter in such a way as to be tilted front and rear. Accordingly, the left and right rotation and/or up and down movement of the supporter and the receptacle received in the supporter, and the front and rear rotation of the receptacle can be performed at the same time or different times.

In the dryer stand according to an embodiment of the present disclosure, the controller can automatically change the air discharge direction of the dryer by controlling the rotation direction and angle of at least one of the rotation motor, the elevation motor or the tilting motor based on the position and size of an object to be dried, which are detected by a sensing apparatus.

Means for solving problems that are not described above may be sufficiently derived from the description of embodiments of the present disclosure.

DESCRIPTION OF EXEMPLARY EMBODIMENTS

The advantages and features of the present disclosure and a method of achieving them will become apparent with reference to the embodiments described in detail below together with the accompanying drawings. However, the present disclosure is not limited to the embodiments set forth herein but may be embodied in many different forms, and these embodiments are provided so that the disclosure of the present disclosure is complete and that those skilled in the art will fully understand the scope of the present disclosure, and the present disclosure is only defined by the scope of the claims. Like reference numerals designate like elements throughout the specification.

Figure 1:
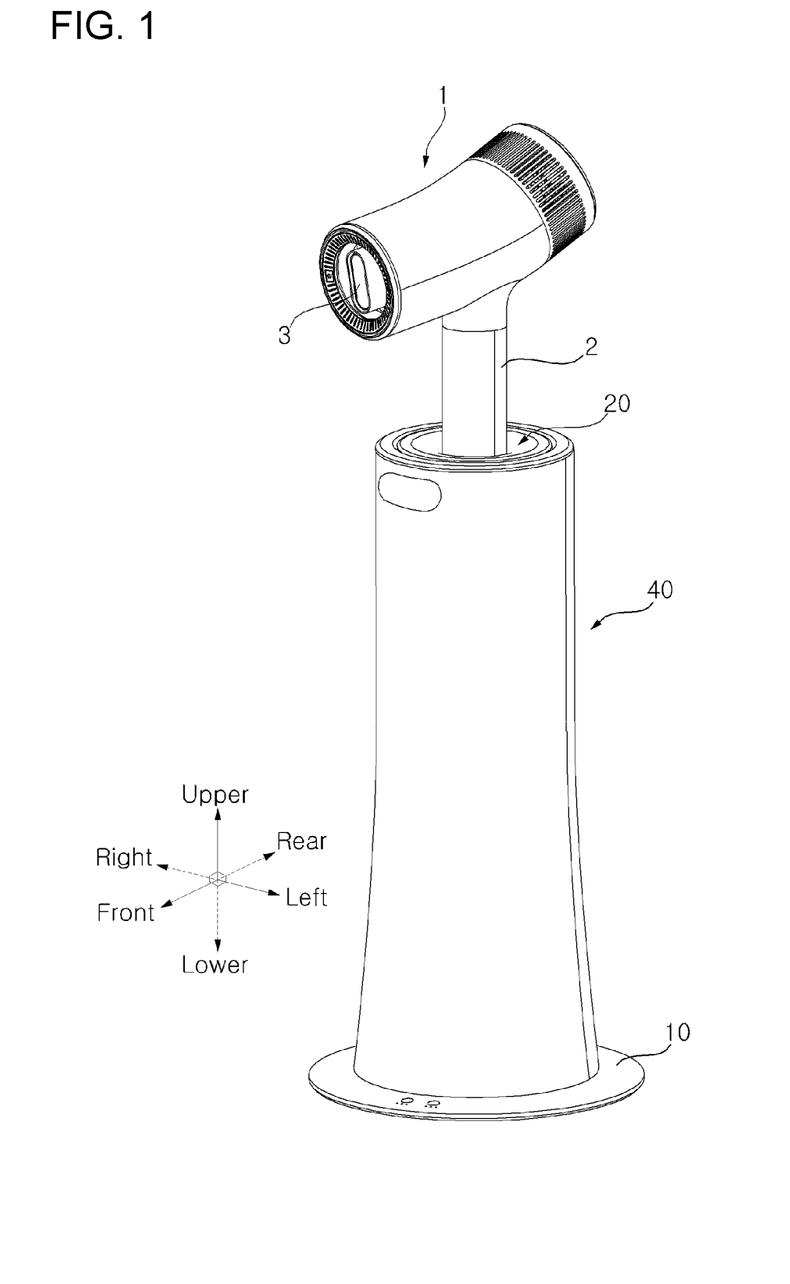
FIG. 1 is a perspective view illustrating the state in which a dryer has been mounted on a dryer stand according to an embodiment.

In the present disclosure, FIG. 1 may be described as a three-dimensional coordinate system named a front, a rear, upper, lower, a left and a right.

Figure 2:
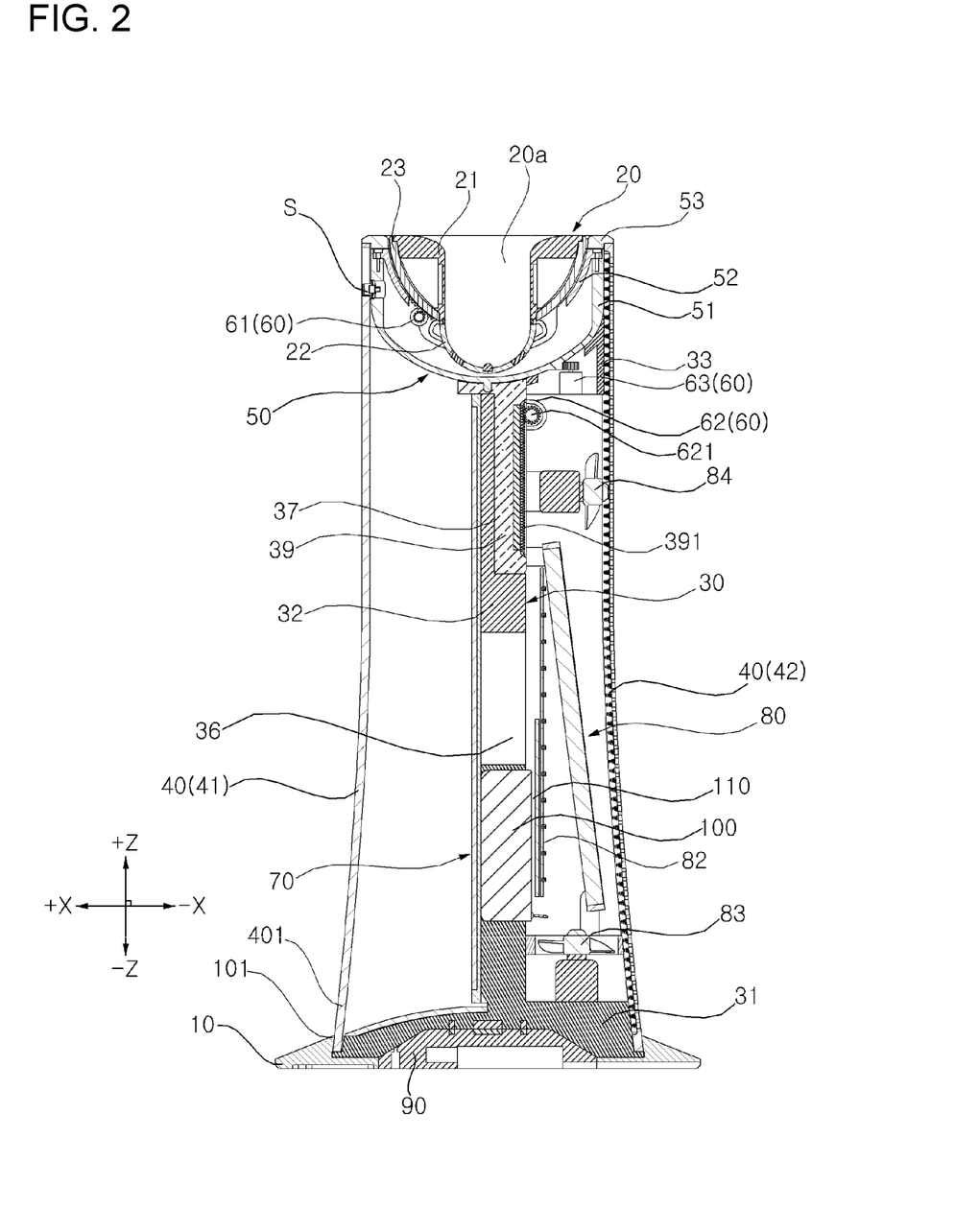
FIG. 2 is a longitudinal sectional view illustrating the state in which the dryer stand has been coupled to a docking station according to an embodiment.

The present disclosure may be described based on a spatial orthogonal coordinate system based on an X axis, a Y axis and a Z axis which are orthogonal to each other in FIG. 2, etc. In this specification, an X axis, a Y axis and a Z axis are defined as follows: up and down directions are defined as a Z axis direction, front and rear directions are defined as an X axis direction, and left and right directions are defined as the Y axis direction. Each axis direction (i.e., X axis direction, Y axis direction or Z axis direction) means both directions in which each axis extends. A symbol "+" attached ahead of each axis direction (i.e., +X axis direction, +Y axis direction or +Z axis direction) means a positive direction, that is, any one of both directions in which each axis extends. A symbol "−" attached ahead of each axis direction (i.e., −X axis direction, −Y axis direction or −Z axis direction) means a negative direction, that is, any one of both directions in which each axis extends.

Hereinafter, a dryer stand according to an embodiment is described with reference to FIGS. 1 to 4.

Figure 3:
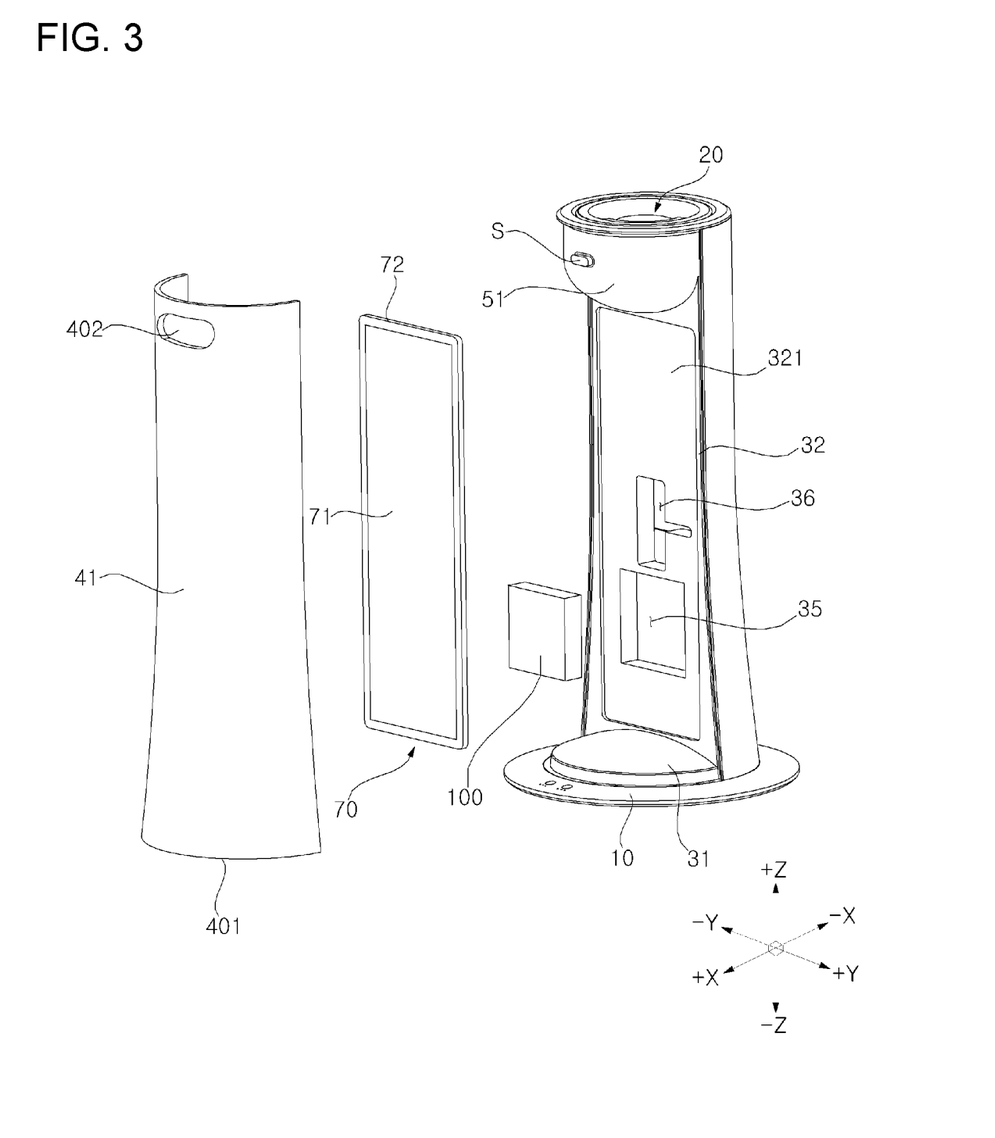
FIG. 3 is an exploded perspective view illustrating the front of the dryer stand according to an embodiment.
Figure 4:
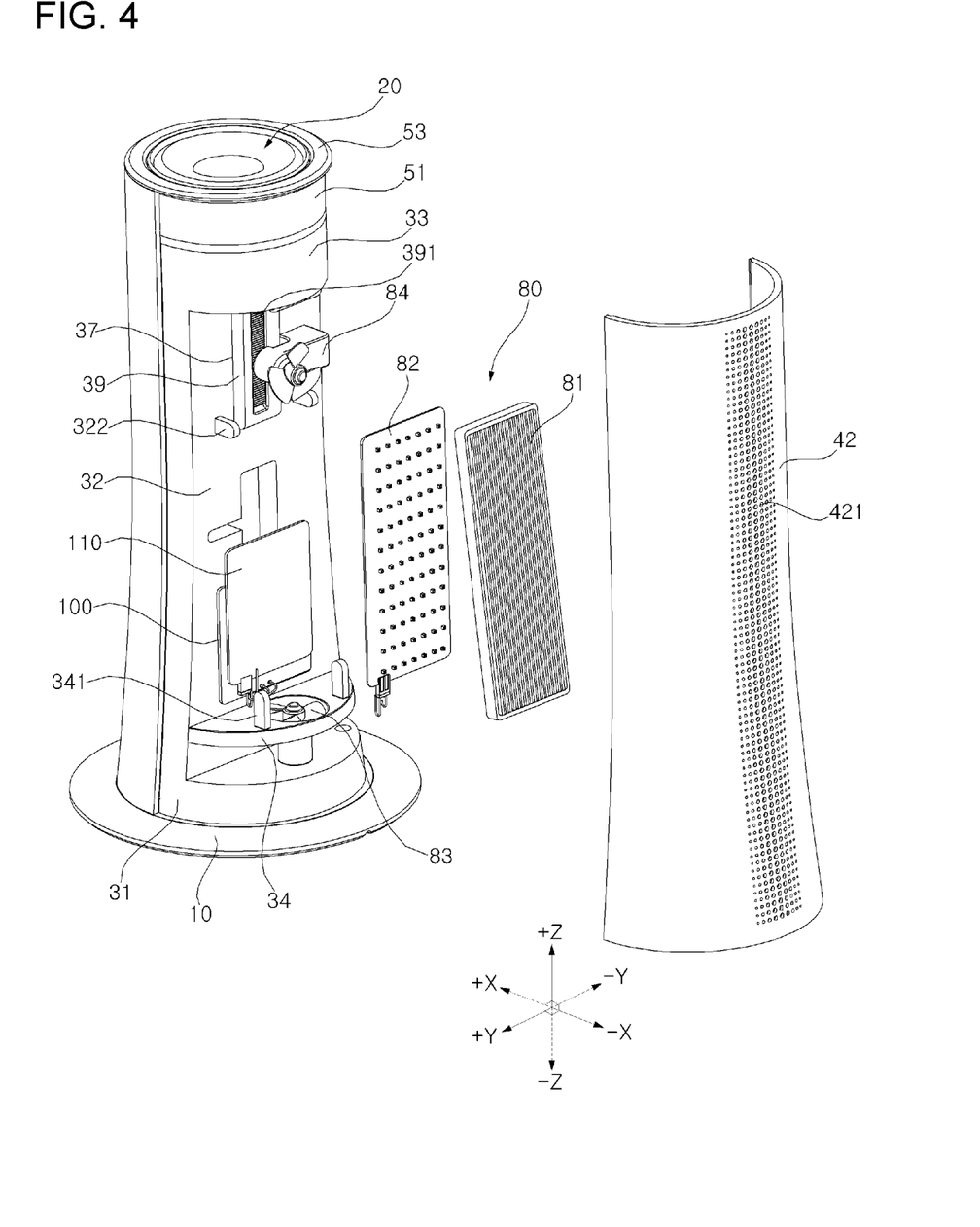
FIG. 4 is an exploded perspective view illustrating the back of the dryer stand according to an embodiment.

FIG. 1 is a perspective view illustrating the state in which a dryer has been mounted on a dryer stand according to an embodiment. FIG. 2 is a longitudinal sectional view illustrating the state in which the dryer stand has been coupled to a docking station according to an embodiment. FIG. 3 is an exploded perspective view illustrating the front of the dryer stand according to an embodiment. FIG. 4 is an exploded perspective view illustrating the back of the dryer stand according to an embodiment.

The dryer stand (hereinafter simply referred to as the "stand") according to an embodiment can perform dry on an object to be dried without a need for a user to hold a dryer 1 because the dryer 1 can be mounted on the stand, as shown in FIG. 1.

As shown in FIGS. 1 and 2, the stand according to an embodiment includes a base 10 positioned at the bottom and configured to perform a support function, a receptacle 20 on which a dryer 1 is mounted, and a stem 30 configured to stand upright up and down between the base 10 and the receptacle 20 and to support the receptacle 20 at a location of a given height upward from the base 10.

The dryer 1 may be detachably mounted on the receptacle 20 as shown in FIGS. 1 and 2.

The stand may include a side cover 40 positioned to surround the stem 30 and form a side appearance of the stand. The side cover 40 may include a front cover 41 and a rear cover 42. The lower end 401 of the side cover 40 may be inserted into a ring-shaped groove 101 formed by the base 10 and a lower plate 31.

In some embodiments, the stem 30 may be omitted, and the side cover 40 may perform the function of the stem. In this case, the side cover 40 may be denoted as the stem.

As shown in FIGS. 2 to 4, the stand according to an embodiment may include a lighting device 70 (or light) and an air purifier 80.

As shown in FIGS. 2 and 3, the lighting device 70 may include a light-emitting panel 71 and a lighting frame 72. The light-emitting panel 71 may be configured with an LED plate in which multiple LEDs are embedded.

The lighting frame 72 is inserted into a concave part 321 depressed backward from the front surface of a vertical plate 32, so the lighting device 70 may be seated in the concave part 321 detachably. The front cover 41 positioned in front of the lighting device 70 may be made of a transparent or semi-transparent material so that light emitted from the lighting device 70 is radiated to the outside.

In some embodiments, the lighting device 70 is curvedly formed using an OLED panel having excellent flexibility so that it closely adheres to the inner side of the front cover 41, thus being capable of improving the radioactivity of light emitted from the OLED panel.

As shown in FIGS. 2 and 4, the air purifier 80 may include a filter 81 positioned between the vertical plate 32 and the rear cover 42. Furthermore, the air purifier 80 may include a suction fan 83 and a discharge fan 84, which generate a flow of air that is received from the outside and discharged to the outside again via the filter 81. In this case, the reception and/or discharge of the air may be performed through multiple through holes 421 formed in the rear cover 42.

In some embodiments, the filter 81 may be a photocatalytic filter also capable of a pet smell or aged smell removal function or any type of smell (i.e., deodorization function). In this case, a blue light-emitting panel 82 for activating the function of the photocatalytic filter may be positioned in front of the filter 81. The stem 30 may include an upper trapping piece 322 protruded backward from the vertical plate 32 and a lower trapping piece 341 protruded upward from the partition wall 34. The filter 81 may be positioned in the upper trapping piece 322 and the lower trapping piece 341 detachably. The upper trapping piece 322 may be configured as a pair of spaced upper trapping pieces 322 to support the upper side of the filter 81. The lower trapping piece 341 may be configured as a pair of spaced lower trapping pieces 341 to support the lower side of the filter 81. The filter 81 is interposed between the pair of upper trapping pieces 322 and the pair of lower trapping pieces 341, and may be detachably positioned with inclination in the state in which the lower part of the filter is more backward protruded than the upper part thereof.

As shown in FIGS. 2 and 4, a battery 100 may be detachably positioned in the hollow unit 35 (or hollow portion) of the vertical plate 32. A controller 110 may be positioned in the rear of the battery 100. The controller 110 may control the operations of the lighting device 70 and the air purifier 80. Furthermore, the controller 110 may control the operations of a stem rotation apparatus, a rotation apparatus, an elevation apparatus, and a tilting apparatus for controlling the air discharge direction of the dryer 1, and is described more specifically later.

The battery 100 may supply required power to an element that requires power among the elements, and may charge a battery 5 embedded in the dryer 1, via first and second electrical terminals 217 and 218 of the stand, if the dryer 1 is mounted on the receptacle 20.

Furthermore, as shown in FIG. 2, the stand includes a docking station 90. External power may be applied to the battery 100 and/or an element that requires power among the elements of the stand through the docking station 90.

The present disclosure has been made to provide the stand, which can automatically change the air discharge direction of the dryer 1 by changing a position based on the position and size of an object to be dried and can then return to its original position, without being limited to the stand on which the dryer 1 is mounted.

To this end, as shown in FIGS. 1, 2, the stem 30 to which the receptacle 20 is coupled may be rotated left and right. The receptacle 20 may be rotated left and right and/or front and back or may be moved (or elevated) up and down independently of the stem 30. The operation may be returned to an original position, and a configuration related to the operation is described later in detail.

Hereinafter, an element capable of automatically changing the air discharge direction of the dryer 1, among the elements of the stand according to an embodiment of the present disclosure, and an element related to the element are described more specifically with reference to FIGS. 1 to 8.

Figure 5:
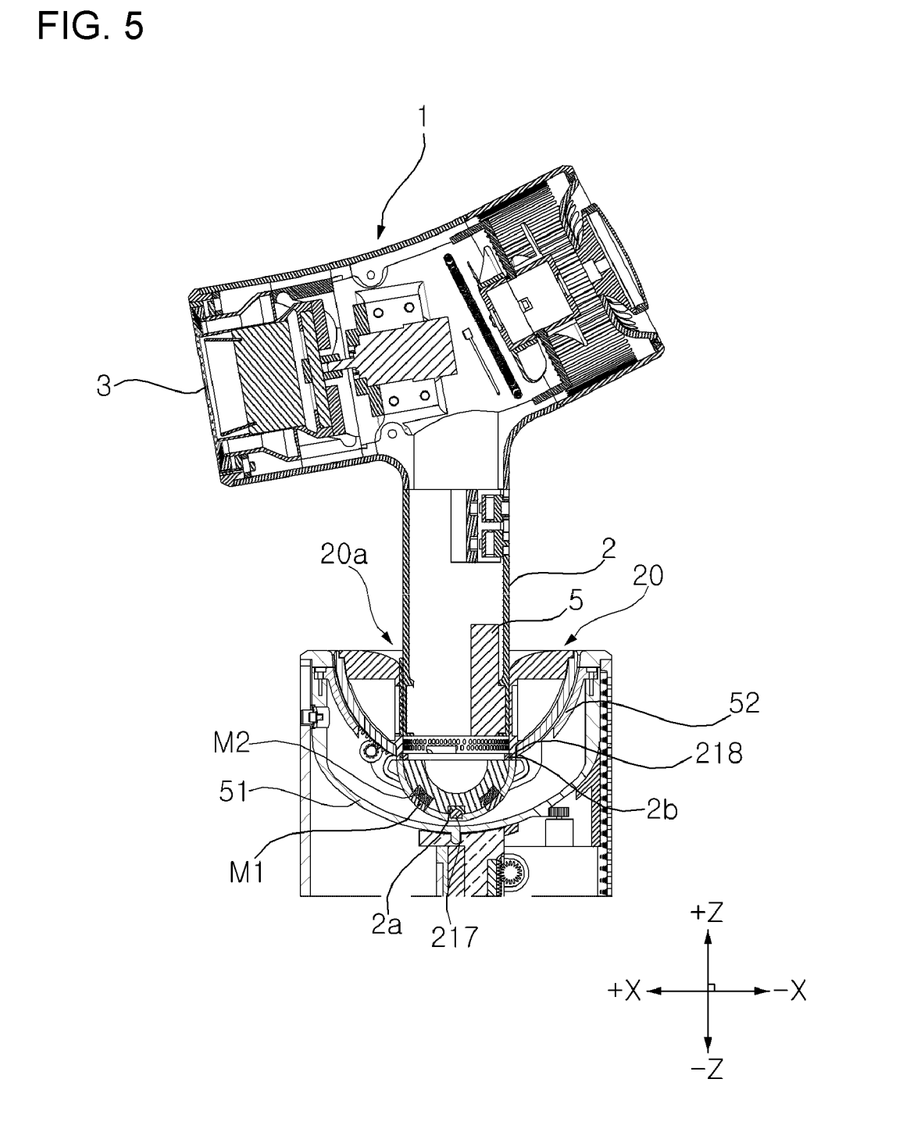
FIG. 5 is a cross-sectional view of an upper part illustrating the state in which the dryer has been mounted on the dryer stand according to an embodiment.
Figure 6:
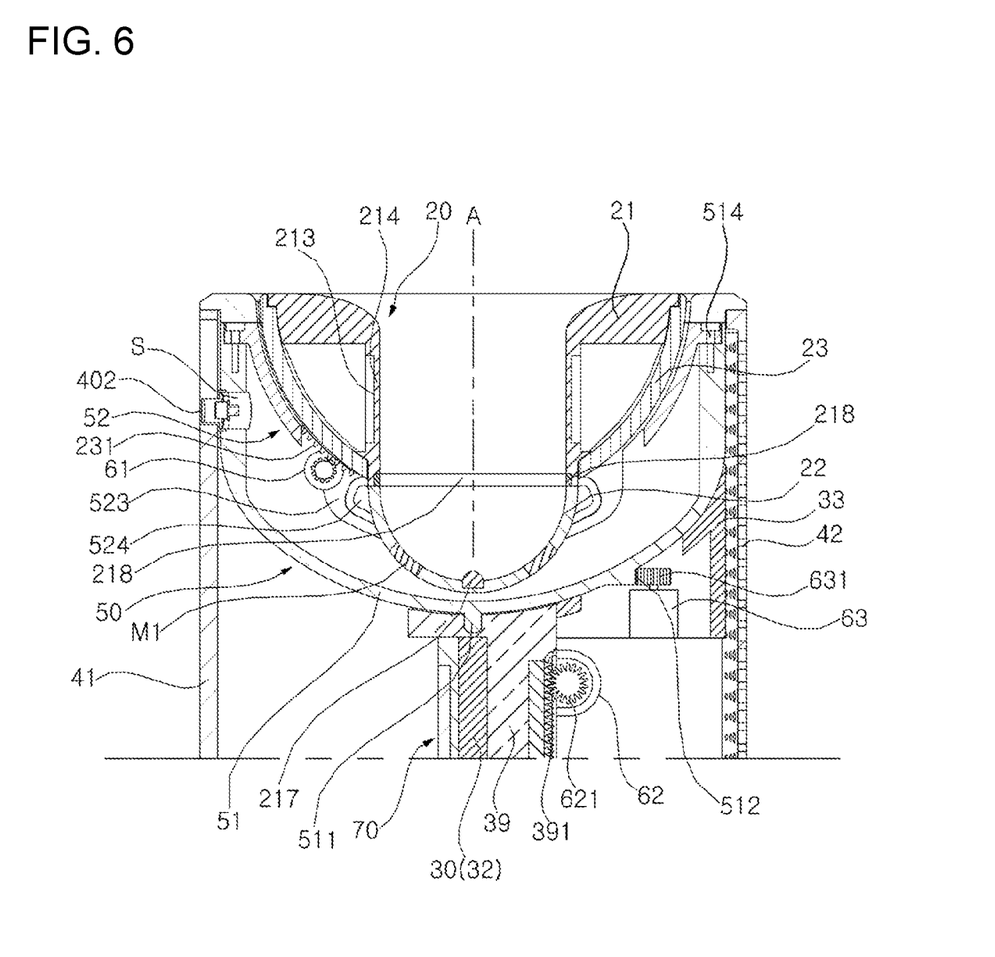
FIG. 6 is a cross-sectional view of an upper part illustrating the dryer stand according to an embodiment.
Figure 7:
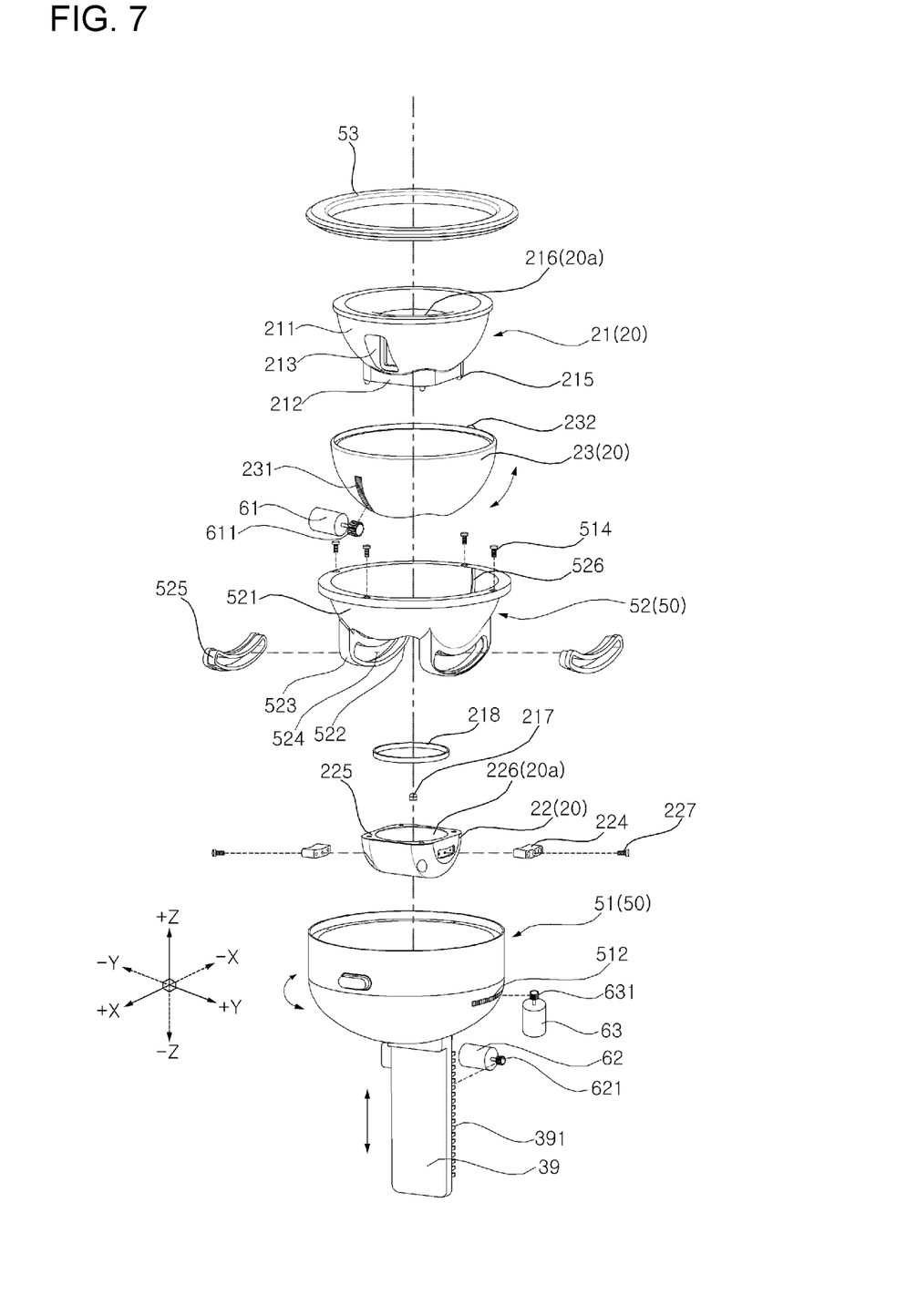
FIG. 7 is an exploded perspective view of an upper part illustrating the dryer stand according to an embodiment.
Figure 8:
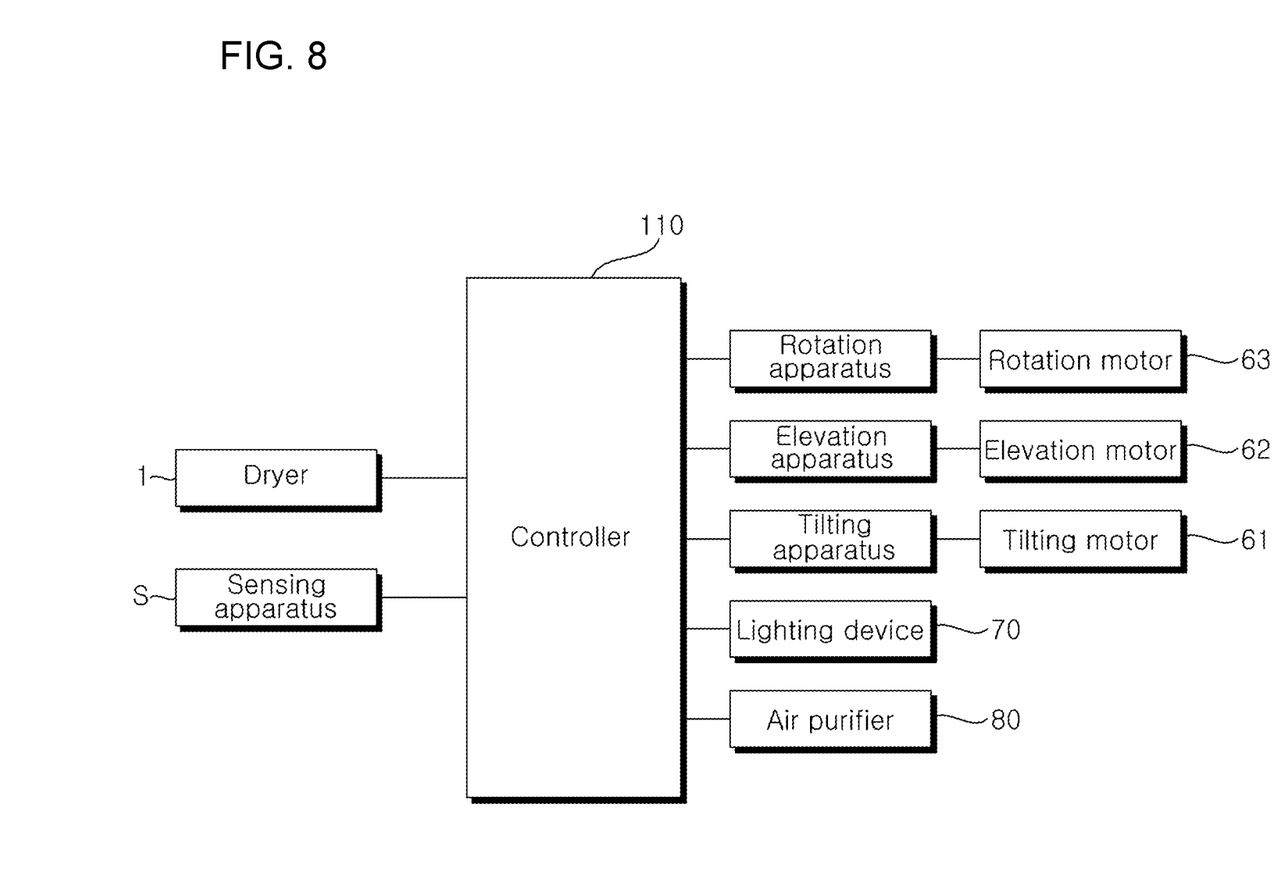
FIG. 8 shows a control system diagram of the dryer stand according to an embodiment.

FIG. 5 is a cross-sectional view of an upper part illustrating the state in which the dryer has been mounted on the dryer stand according to an embodiment. FIG. 6 is a cross-sectional view of an upper part illustrating the dryer stand according to an embodiment. FIG. 7 is an exploded perspective view of an upper part illustrating the dryer stand according to an embodiment. FIG. 8 shows a control system diagram of the dryer stand according to an embodiment.

The dryer 1 is an apparatus that performs dry on an object to be dried, such as a person or a pet, using air for drying discharged through an outlet 3. As described above, the stand according to an embodiment relates to a stand on which the dryer 1 is mounted.

As shown in FIGS. 2 and 5, the stand includes the stem 30 extended up and down or in the Z axis direction, the base 10 positioned under the stem 30, the receptacle 20 positioned over the stem 30 and configured to have the dryer 1 detachably mounted thereon, the docking station 90 positioned in the base 10 to apply external power, and a moving apparatus configured to move the receptacle 20 in a given direction.

As shown in FIG. 4, the stem 30 may include a lower plate 31 positioned on top of the base 10 and coupled to the base 10 by fastening means, such as a set screw, the vertical plate 32 extended upward from the lower plate 31, and an extension unit 33 (or extension portion) backward extended from an end on the upper side of the vertical plate 32 and then downward curved.

The air purifier 80 may be positioned in a partition wall 34 protruded backward from the lower side of the vertical plate 32. The battery 100 may be positioned in the hollow unit 35 formed on the lower side at the center of the vertical plate 32. A hole 36 through which an electric wire electrically connected to each of elements included in the stand passes may be formed over the hollow unit 35.

The vertical rod 39 may be positioned in a groove 37 that is lengthily formed up and down at the back of the upper side of the vertical plate 32 in such a way as to move up and down. In other words, at least part of the vertical rod 39 may be inserted into the groove 37 to move up and down, which is described more specifically later.

The base 10 functions as the support of the stand, and may provide the space in which the stand is placed on the docking station 90. An electrode terminal electrically connected to the electrode terminal of the docking station 90 so that external power is applied to the stand through the docking station 90 may be provided at the bottom of the base 10.

As shown in FIGS. 2, 5 to 7, the receptacle 20 includes a tub 21, 22 configured to form a groove 20a into which the grip 2 of the dryer 1 is inserted. The tub 21, 22 may include an upper tub 21 and a lower tub 22.

The upper tub 21 may include a tub body 211 formed in an approximately hemispheric shape having a wide-top narrow-bottom shape and a lower protrusion unit 212 extended downward from the tub body 211. The upper tub 21 may include an aperture 216 that forms a portion of the groove 20a of the tub 21, 22. That is, the groove 20a of the tub 21, 22 includes an aperture 216 of the upper tub 21. The lower tub 22 may include an aperture 226 that forms a portion of the groove 20a of the tub 21, 22. That is, the groove 20a of the tub 21, 22 may also include the aperture 226 of the lower tub 22.

A concave part 213 that is depressed inward may be formed on at least one side of the tub body 211. As a result, a portion that belongs to the tub body 211 and that is positioned between the concave part 213 and the groove 20a has a smaller thickness than other portions. A portion 214 positioned between the concave part 213 and the groove 20a has a smaller thickness than other portions due to the concave part 213. Accordingly, heat generated within the dryer 1 inserted into the groove 20a while the dryer 1 operates can be discharged through the concave part 213.

Protrusions 215 may be formed on a surface on the lower side of the lower protrusion unit 212 (or protrusion assembly). Grooves 225 into which the protrusions 215 are inserted may be formed in a surface on the upper side of the lower tub 22. Accordingly, the upper tub 21 and the lower tub 22 may be integrated and coupled to one another.

Furthermore, the receptacle 20 may include a tub cover 23 to surround the outskirts of the upper tub 21. The tub cover 23 is formed in an approximately hemispheric shape having a wide-top narrow-bottom shape. The tub cover 23 is positioned to surround the outskirts of the tub body 211, and may be integrated and coupled to the upper tub 21.

The receptacle 20 may be received into a supporter 50 positioned on the vertical rod 39.

The supporter 50 can support the receptacle 20 movably between the receptacle 20 and the stem 30. In this case, the movement is used as a comprehensive meaning, including a rotation in the left and right direction (i.e., rotation around the Z axis), a movement in the up and down direction (i.e., a straight-line movement in the Z axis direction) or rotation in the front and rear direction (i.e., rotation around the Y axis), and the same principle is applied hereunder.

If the grip 2 of the dryer is inserted into the receptacle 20, first and second target contact terminals 2a and 2b electrically connected to the first and second contact terminals 217 and 218 may be positioned in the grip. That is, the dryer includes first and second contact terminals 2a and 2b that are electrically connected with the first and second contact terminals 217 and 218, respectively, when the grip 2 of the dryer is inserted into the receptacle 20. The second contact terminal 218 may have a ring shape. In the present disclosure, when the grip 2 is inserted into the groove 20a, the grip 2 is fixed to the groove 20a at a specific location by means of fixing means, such as a magnet M1, M2. Accordingly, the discharge direction of air for drying discharged through the outlet 3 of the dryer 1 can be changed by moving the receptacle 20.

As shown in FIGS. 2, 5 to 7, the supporter 50 may include a supporter body 51 rotatably coupled to the top of the vertical rod 39 and a guide supporter 52 fixed to the upper side of the supporter body 51 by a set screw 514 and received into the supporter body 51. The top of the supporter 50 may be covered with the ring-shaped upper cover 53.

The supporter body 51 may be formed in an approximately tub shape having a top open and a bottom of a hemispheric shape. The receptacle 20 is coupled to the guide supporter 52, which can guide a movement of the receptacle 20 and can be moved along with the receptacle 20. This is described more specifically later.

As shown in FIGS. 2, 5 to 7, the rotation apparatus may be positioned in the supporter 50.

The rotation apparatus may include an electrically driven rotation motor 63, a rotation pinion 631 coupled to the rotation shaft of the rotation motor 63, and rotation gear teeth 512 geared with the rotation pinion 631.

The rotation gear teeth 512 may be formed on one side of the supporter 50. More specifically, the rotation gear teeth 512 may be laterally extended in an arc shape along a curved outer circumference surface on the lower side of the supporter body 51.

As described above, the top of the vertical rod 39 may be connected to the bottom of the supporter body 51. In this case, an inward depressed groove is formed in the top surface of the vertical rod 39. A protruded part 511 that is rotatably inserted into the groove may be formed in the bottom surface or the center of the bottom of the supporter body 51. That is, the protruded part 511 of the support body 51 is rotatable with respect to the vertical rod 39, and is provided within the groove of the vertical rod 39, as illustrated in FIG. 6.

As the rotation motor 63 is rotated around the protruded part 511, inserted into the groove, forward or backward, the receptacle 20 coupled to the supporter body 51 can be rotated left and right (i.e., rotated around the Z axis) through the medium of the supporter body 51 and the guide supporter 52.

The stand according to an embodiment of the present disclosure may further include the elevation apparatus for moving the vertical rod 39 and the supporter 50 up and down. The elevation apparatus may be positioned in the stem 30.

The elevation apparatus may include an electrically driven elevation motor 62, an elevation pinion 621 coupled to the rotation shaft of the elevation motor 62, and the vertical rod 39 movably positioned in the stem 30 up and down. In this case, an elevation rack 391 is formed on the side of the back of the vertical rod 39 and geared with the elevation pinion 621.

Accordingly, the receptacle 20 coupled to the supporter body 51 can be moved up and down (i.e., moved in the Z axis direction) through the medium of the supporter body 51 coupled to the top of the vertical rod 39 and the guide supporter 52 by rotating the elevation motor 62 forward or backward.

In this case, as shown in FIGS. 4 to 6, when the supporter body 51 is positioned at the lowest location, the extension unit 33 (or extension portion) may support at least part of the bottom of the supporter body 51 so that the supporter body 51 is rotated left and right. Accordingly, the left and right rotation of the receptacle 20 can be further stabilized.

Furthermore, since the rotation motor 63 is coupled to the vertical rod 39, the rotation motor 63 is also moved up and down as the vertical rod 39 is moved up and down. Accordingly, the up and down movement and left and right rotation of the supporter body 51 and the receptacle 20 may be performed at the same time or different times.

The stand according to an embodiment of the present disclosure may further include the tilting apparatus for rotating the receptacle 20 front and back (i.e., tilting rotation around the Y axis). In this case, the receptacle 20 may be received within the supporter body 51 in such a way as to be tilted front and rear.

The tilting apparatus may include an electrically driven tilting motor 61, a tilting pinion 611 coupled to the rotation shaft of the tilting motor 61, and tilting gear teeth 231 geared with the tilting pinion 611. In this case, the tilting gear teeth 231 may be extended in an arc shape up and down on the outer side of the tub cover 23.

Furthermore, the tilting apparatus may include a guide supporter 52, that is, an element for guiding the tilting of the receptacle 20.

The guide supporter 52 may include a trumpet-shaped guide body 521 in which a lower central part 522 is open and an inner side forms an arc shape up and down and a pair of guide rails 523 which is downward protruded from both ends of the guide body 521 and in which an arc-shaped guide groove 524 is formed front and back.

In this case, as shown in FIG. 7, a buffering rail 525 capable of performing a buffering function and reducing a friction force may be inserted into the guide rail 523.

The receptacle 20 may be coupled to the guide supporter 52 and tilted. More specifically, the protruded pieces 224 coupled by the set screw 227 on both sides of the lower tub 22 may be inserted into the guide groove 524 formed in the guide rail 523 in such a way as to be rotated front and back.

Accordingly, the protruded piece 224 can be moved along the guide groove 524 by rotating the tilting motor 61 forward and backward, so the receptacle 20 can be rotated front and back (i.e., rotate around the Y axis).

In order to guide the front and back rotation (or tilting) of the receptacle 20 more stably, a protruded part 232 may be formed at the outer side of the tub cover 23, and a groove 526 into which the protruded part 232 is inserted and guided may be formed in the inner side of the guide body 521.

As described above, in the stand according to an embodiment of the present disclosure, the receptacle 20 can be moved up and down and/or rotated front and back simultaneously with or at timing different from that of left and right rotation.

As shown in FIGS. 2, 3, 5 to 7, the stand according to an embodiment of the present disclosure includes the sensing apparatus S for detecting the position and size of an object to be dried. The sensing apparatus S may be an image photographing device, such as a camera, or a proximity sensor.

The sensing apparatus S may detect the position and size of an object to be dried, which is positioned outside the stand, through a detection hole 402 formed in the front cover 41.

The sensing apparatus S is positioned in the front surface of the supporter body 51 and may be moved with a movement of the supporter body 51. In this case, the detection hole 402 maybe formed by taking into consideration the moving range and angle of view of the sensing apparatus S.

In an embodiment of the present disclosure, the sensing apparatus S is spaced apart from the supporter body 51 and may be fixed to a given location regardless of a movement of the supporter body 51. In this case, the detection hole 402 may be formed by taking into consideration the fixing location and an angle of view of the sensing apparatus S.

The stand according to an embodiment may include a controller 110. The controller 110 may control a movement of the receptacle 20, as shown in FIG. 8.

The controller 110 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electrical units (or electrical assemblies) for performing functions.

The controller 110 may automatically control a movement of the receptacle 20 by controlling the rotation direction and angle of at least one of the rotation motor 63, the elevation motor 62 or the tilting motor 61 based on information (e.g., the position and size of an object to be dried) on the object to be dried, which is detected by the sensing apparatus S.

The present disclosure has one or more of the following effects.

First, dry can be performed on an object to be dried without a need for a user to hold the dryer because the dryer can be used and manipulated with it mounted on the stand.

Second, the discharge direction of air for drying can be automatically changed left and right based on the position and size of an object to be dried because the electrically driven rotation apparatus rotates the receptacle on which the dryer is mounted left and right based on information on the object to be dried, which is detected by the sensing apparatus.

Third, the receptacle is received within the supporter in such a way as to be tilted front and rear. The receptacle can be rotated front and back by the tilting apparatus. The supporter can be rotated left and right by the rotation apparatus and can also be moved up and down by the elevation apparatus. Accordingly, the discharge direction of air for drying of the dryer mounted on the receptacle can be changed up and down, left and right, and/or front and rear.

The stand according to embodiments of the present disclosure has been described above. However, the present disclosure is not limited to the embodiments, and may be implemented within various modifications or an equivalent range which may be predicted by a person having ordinary skill in the art to which the present disclosure pertains without departing from the gist of the present disclosure.

What is claimed is:

1. A dryer stand on which a dryer for discharging air for drying is mounted, the dryer stand comprising:
a stem extending upward along a first axis;
a base positioned under the stern;
a receptacle positioned over the stem and configured to have the dryer mounted thereon;
a supporter configured to receive the receptacle thereon; and
a rotator comprising an electrically driven rotation motor,
wherein the rotator rotates the receptacle in first or second directions opposite to each other about a second axis which is perpendicular to the first axis in accordance with a rotation of the rotation motor, and
wherein the rotator is positioned at the supporter.

2. The dryer stand of claim 1, wherein the rotator further comprises:
a rotation pinion coupled to a rotation shaft of the rotation motor; and
rotation gear teeth geared with the rotation pinion.

3. The dryer stand of claim 2, wherein the rotation gear teeth are formed on one side of the supporter.

4. The dryer stand of claim 3, wherein the supporter comprises a curved outer circumference surface, and
wherein the rotation gear teeth are extended in an arc shape along the curved outer circumference surface.

5. The dryer stand of claim 1, further comprising a vertical rod positioned in the stem and having a top surface connected to the supporter,
wherein the vertical rod extends upward along the first axis.

6. The dryer stand of claim 5, wherein the vertical rod comprises an inward depressed groove formed in the top surface of the vertical rod,
wherein a protruded part is formed at a bottom of the supporter,
wherein the protruded part is inserted into the inward depressed groove of the vertical rod to connect the vertical rod to the supporter, and
wherein the protruded part is rotatable with respect to the inward depressed groove of the vertical rod.

7. The dryer stand of claim 6, wherein the supporter is rotated with respect to the protruded part in the first or second directions in response to the rotation of the rotation motor.

8. The dryer stand of claim 5, further comprising an elevator positioned within the stem and configured to move the vertical rod and the supporter upward and downward along the first axis.

9. The dryer stand of claim 8, wherein the stem includes an extension portion at an upper end of the stem, and
wherein when the vertical rod is positioned at a lowest position, the supporter is positioned at a lowest position and the extension portion rotatably supports at least part of a bottom of the supporter so that the supporter is rotatable in the first and second directions about the second axis.

10. The dryer stand of claim 8, further comprising an elevation motor engaging the vertical rod to move the vertical rod upward and downward along the first axis.

11. The dryer stand of claim 1, further comprising a titter configured to rotate the receptacle about a third axis with respect to the supporter, the third axis being perpendicular to the first axis and the second axis.

12. The dryer stand of claim 1, further comprising:
a sensor configured to detect a position and a size of an object to be dried; and
a controller configured to control a rotation direction and an angle of the rotation motor based on the position and the size of the object detected by the sensor.

13. The dryer stand of claim 12, wherein the sensor is positioned on one side of the supporter and is moved along with the supporter.

14. A dryer stand on which a dryer for discharging air for drying is mounted, the dryer stand comprising:
- a stem extending upward along a first axis;
- a base positioned under the stem;
- a receptacle positioned over the stem and configured to have the dryer mounted thereon;
- a supporter configured to receive the receptacle thereon;
- a vertical rod extending vertically along the first axis and connected to the supporter; and
- an elevator positioned within the stem and configured to move the receptacle upward and downward along the first axis,
- wherein the supporter comprises a protrusion extending downwardly along the first axis and engaging a groove of the vertical rod, and
- wherein the supporter is rotatable with respect to the vertical rod about the protrusion of the supporter.

15. The dryer stand of claim 14, wherein the elevator is configured to move the receptacle by moving the vertical rod along the first axis.

16. The dryer stand of claim 14, wherein the vertical rod includes an elevation rack formed on a side thereof,
- wherein the elevator includes an elevator motor and an elevation pinion coupled to a rotation shaft of the elevator motor, and
- wherein the elevation pinion engages the elevation rack to move the vertical rod along the first axis.

* * * * *